(12) United States Patent
Kuroda (10) Patent No.: US 8,876,318 B2
(45) Date of Patent: Nov. 4, 2014

(54) ILLUMINATION DEVICE AND DISPLAY DEVICE INCORPORATING SAME

(75) Inventor: Tatsuro Kuroda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 189 days.

(21) Appl. No.: 13/695,490

(22) PCT Filed: Jan. 13, 2011

(86) PCT No.: PCT/JP2011/050414
§ 371 (c)(1),
(2), (4) Date: Oct. 31, 2012

(87) PCT Pub. No.: WO2011/145355
PCT Pub. Date: Nov. 24, 2011

(65) Prior Publication Data
US 2013/0050991 A1    Feb. 28, 2013

(30) Foreign Application Priority Data

May 19, 2010 (JP) .................................. 2010-115205

(51) Int. Cl.
*G09F 13/04* (2006.01)
*G02F 1/1335* (2006.01)
*G02F 1/1333* (2006.01)

(52) U.S. Cl.
CPC .............. *G02F 1/133606* (2013.01); *G02F 2001/133322* (2013.01)
USPC ........................................ 362/97.2; 362/97.1

(58) Field of Classification Search
USPC ................................ 362/97.1, 97.2, 628, 246
See application file for complete search history.

(56) References Cited

U.S. PATENT DOCUMENTS

| | | | |
|---|---|---|---|
| 2006/0072343 A1 | 4/2006 | Shimizu | |
| 2008/0304288 A1 | 12/2008 | Iwasaki | |
| 2009/0097277 A1 * | 4/2009 | Iwasaki | ......................... 362/628 |

FOREIGN PATENT DOCUMENTS

| | | |
|---|---|---|
| JP | 2000-340017 A | 12/2000 |
| JP | 2004-086046 A | 3/2004 |
| JP | 2005-285620 A | 10/2005 |
| JP | 2008-305713 A | 12/2008 |
| JP | 2009-210763 A | 9/2009 |

OTHER PUBLICATIONS

An International Search Report, dated Apr. 19, 2011, issued in International Application No. PCT/JP2011/050414.

* cited by examiner

*Primary Examiner* — Vip Patel
(74) *Attorney, Agent, or Firm* — Lowe Hauptman & Ham, LLP (57) ABSTRACT

An illumination device is provided that can reduce the displacement of the position of a diffusion plate. This illumination device includes the diffusion plate and a fixing pin that fixes the diffusion plate. When seen in plan view from the side of the light emitting surface of the diffusion plate, a diffusion plate fixing portion is provided in a perimeter portion on the side of the light emitting surface of the diffusion plate, and the fixing pin is engaged with the diffusion plate fixing portion.

15 Claims, 10 Drawing Sheets

ILLUMINATION DEVICE AND DISPLAY DEVICE INCORPORATING SAME

RELATED APPLICATIONS

The present application is a National Stage of PCT/JP2011/050414, filed Jan. 13, 2011, and claims priority from Japanese Application No. 2010-115205, filed May 19, 2010.

TECHNICAL FIELD

The present invention relates to an illumination device and a display device incorporating such as an illumination device.

BACKGROUND ART

In a liquid crystal display device which is one type of display device, since a liquid crystal display panel displaying an image is not luminous, an illumination device called a backlight unit is provided on the back surface side of the liquid crystal display panel (the opposite side to the display surface side of the liquid crystal display panel), the back surface of the liquid crystal display panel is illuminated by the backlight unit and thus a display operation is performed.

In the liquid crystal display device as described above, in order to reduce variations in brightness, it is necessary to uniformly illuminate an effective display region.

Hence, for example, in a direct type backlight unit, a light source is arranged in a region directly below a liquid crystal display panel (region opposite the back surface of the liquid crystal display panel), a diffusion plate is further arranged between the light source and the liquid crystal display panel and light generated by the light source is diffused by the diffusion plate, with the result that the light from the light source is spread over the entire effective display region (for example, see patent document 1).

RELATED ART DOCUMENT

Patent Document

Patent document 1: JP-A-2005-285620

DISCLOSURE OF THE INVENTION

Problems to be Solved by the Invention

In the backlight unit of patent document 1, a diffusion plate is fixed by pressing the perimeter portions (portions corresponding to a non-display region) of the diffusion plate with an enclosure. However, in the method of fixing the diffusion plate described above, the diffusion plate is not rigidly fixed, and thus the position of the diffusion plate is likely to be displaced. When the position of the diffusion plate is displaced, the diffusion plate comes off from a desired installation place, and variations in brightness are produced.

One way to fix the diffusion plate is to fix the diffusion plate with a double-faced tape. However, the adherence of the double-faced tape is reduced at a low temperature under high-humidity conditions. Hence, even if the diffusion plate is fixed with the double-faced tape, the position of the diffusion plate is displaced depending on conditions.

The present invention is made to overcome the foregoing problem; an object of the present invention is to provide an illumination device that can reduce the displacement of a diffusion plate and a display device incorporating such an illumination device.

Means for Solving the Problem

To achieve the above object, according to a first aspect of the present invention, there is provided an illumination device including: a diffusion plate which includes a light entrance surface and a light emitting surface that is an opposite surface to the light entrance surface, and in which light entering the light entrance surface is diffused and is emitted through the light emitting surface; and a fixing member which fixes the diffusion plate. When seen in plan view from a side of the light emitting surface of the diffusion plate, a diffusion plate fixing portion formed with a concave portion or a convex portion is provided in a predetermined portion on a side of the light emitting surface of the diffusion plate, and the fixing member is engaged with the diffusion plate fixing portion. When the diffusion plate fixing portion is formed with the concave portion, the concave portion may be a through hole or may not penetrate.

In the illumination device of the first aspect configured as described above, since the fixing member is engaged with the diffusion plate fixing portion, the unintentional movement and deformation of the diffusion plate are regulated. In other words, the diffusion plate is rigidly fixed, and thus the position of the diffusion plate is unlikely to be displaced. In this way, it is possible to reduce the coming off of the diffusion plate from a desired installation place, the generation of variations in brightness and the like.

In the illumination device of the first aspect, when an optical sheet is placed on the light emitting surface of the diffusion plate, an opening portion for exposing the diffusion plate fixing portion is preferably provided in the optical sheet. In the configuration described above, even when the optical sheet is placed on the light emitting surface of the diffusion plate, the diffusion plate fixing portion is exposed from the opening portion of the optical sheet and thus the fixing member can be engaged with the diffusion plate fixing portion. It is also possible to fix the optical sheet.

Preferably, in the illumination device of the first aspect, the diffusion plate is retained by an enclosure, and the fixing member is provided in a portion of the enclosure. As described above, the fixing member is provided in the portion of the enclosure (member retaining the diffusion plate), and thus the fixing member is easily engaged with the diffusion plate fixing portion.

In the illumination device of the first aspect, the diffusion plate fixing portion may be formed with the concave portion, and a pin member that can be inserted into the diffusion plate fixing portion may be the fixing member. In this configuration, the fixing member (pin member) is inserted into the diffusion plate fixing portion (concave portion), and thus it is possible to easily engage the diffusion plate fixing portion with the fixing member.

In the configuration in which the diffusion plate fixing portion is formed with the concave portion, when seen in plan view from the side of the light entrance surface of the diffusion plate, the diffusion plate fixing portion is preferably also provided in a predetermined portion on the side of the light entrance surface of the diffusion plate. In this configuration, the area of the engagement of the diffusion plate fixing portion with the fixing member can be increased.

In this case, the diffusion plate fixing portion is preferably a through hole that penetrates from the side of the light emitting surface of the diffusion plate to the side of the light entrance surface. In this configuration, the fixing member is made to fully penetrate the diffusion plate fixing portion (through hole), and thus it is possible to easily and more rigidly fix the diffusion plate.

In the configuration in which the diffusion plate fixing portion is formed with the concave portion, the fixing member may be the pin member that tapers. The fixing member (tapering pin member) described above is inserted into the diffusion plate fixing portion (the concave portion including the through hole), and thus it appears as if the wedge is inserted into the diffusion plate fixing portion, with the result that the diffusion plate is very rigidly fixed.

In the illumination device of the first aspect, the diffusion plate fixing portion may be formed with the convex portion, and an insertion portion into which the diffusion plate fixing portion can be inserted may be formed in the fixing member. In this configuration, the diffusion plate fixing portion (convex portion) is inserted into the insertion portion of the fixing member, and thus it is possible to easily engage the diffusion plate fixing portion with the fixing member.

In the illumination device of the first aspect, the diffusion plate fixing portion preferably includes a plurality of diffusion plate fixing portions. In this configuration, it is possible to reliably and rigidly fix the diffusion plate.

In the configuration in which the diffusion plate fixing portion includes a plurality of diffusion plate fixing portions, when the planar shape of the diffusion plate is formed in a shape of a quadrangle, at least one of the diffusion plate fixing portions is preferably arranged in each of perimeter portions of the light emitting surface of the diffusion plate on a side of a pair of sides that are parallel to each other. In this configuration, it is possible to rigidly fix the diffusion plate in a balanced way. In particular, when a large-sized diffusion plate in which its center portion is easily bent is used, two or more (for example, three) of the diffusion plate fixing portions are more preferably arranged in each of perimeter portions of the light emitting surface of the diffusion plate on the side of the pair of sides that are parallel to each other.

In the configuration in which the diffusion plate fixing portions are arranged in each of perimeter portions of the light emitting surface of the diffusion plate on the side of the pair of sides that are parallel to each other, a position where the diffusion plate fixing portion is arranged in the perimeter portion of the light emitting surface of the diffusion plate on a side of one side and a position where the diffusion plate fixing portion is arranged in the perimeter portion on a side of the other side may be displaced from each other. In this configuration, it is possible to determine, from the positions where the diffusion plate fixing portions are arranged, the front and back of the diffusion plate. Hence, the front and back of the diffusion plate are unlikely to be erroneously used when an assembly operation is performed.

In the configuration in which the diffusion plate fixing portion includes a plurality of diffusion plate fixing portions, an area of engagement of a predetermined diffusion plate fixing portion among the plurality of the diffusion plate fixing portions with the fixing member may be greater than an area of engagement of the other diffusion plate fixing portions with the fixing member. In this configuration, for example, even if strong vibrations are produced on the side of one side of the light emitting surface of the diffusion plate, the predetermined diffusion plate fixing portion (diffusion plate fixing portion having a large area of the engagement of the diffusion plate fixing portion with the fixing member) is arranged in the perimeter portion on the side of the one side of the light emitting surface of the diffusion plate, and thus it is possible to reduce the possibility that the position of the diffusion plate is displaced.

In the illumination device of the first aspect, the fixing member or the diffusion plate fixing portion may be movable, and the fixing member or the diffusion plate fixing portion may be moved in a direction in which the diffusion plate is pulled. In this configuration, a tensile stress remains applied to the diffusion plate, and thus the diffusion plate is more rigidly fixed.

According to a second aspect of the present invention, there is provided a display device including: the illumination device of the first aspect; and a display panel illuminated by the illumination device.

Advantages of the Invention

As described above, according to the present invention, it is possible to easily reduce the displacement of the diffusion plate.

DESCRIPTION OF EMBODIMENTS

First Embodiment

An example of the overall configuration of a display device according to the present invention will be described in detail with reference to FIGS. 1 to 3.

Figure 1:
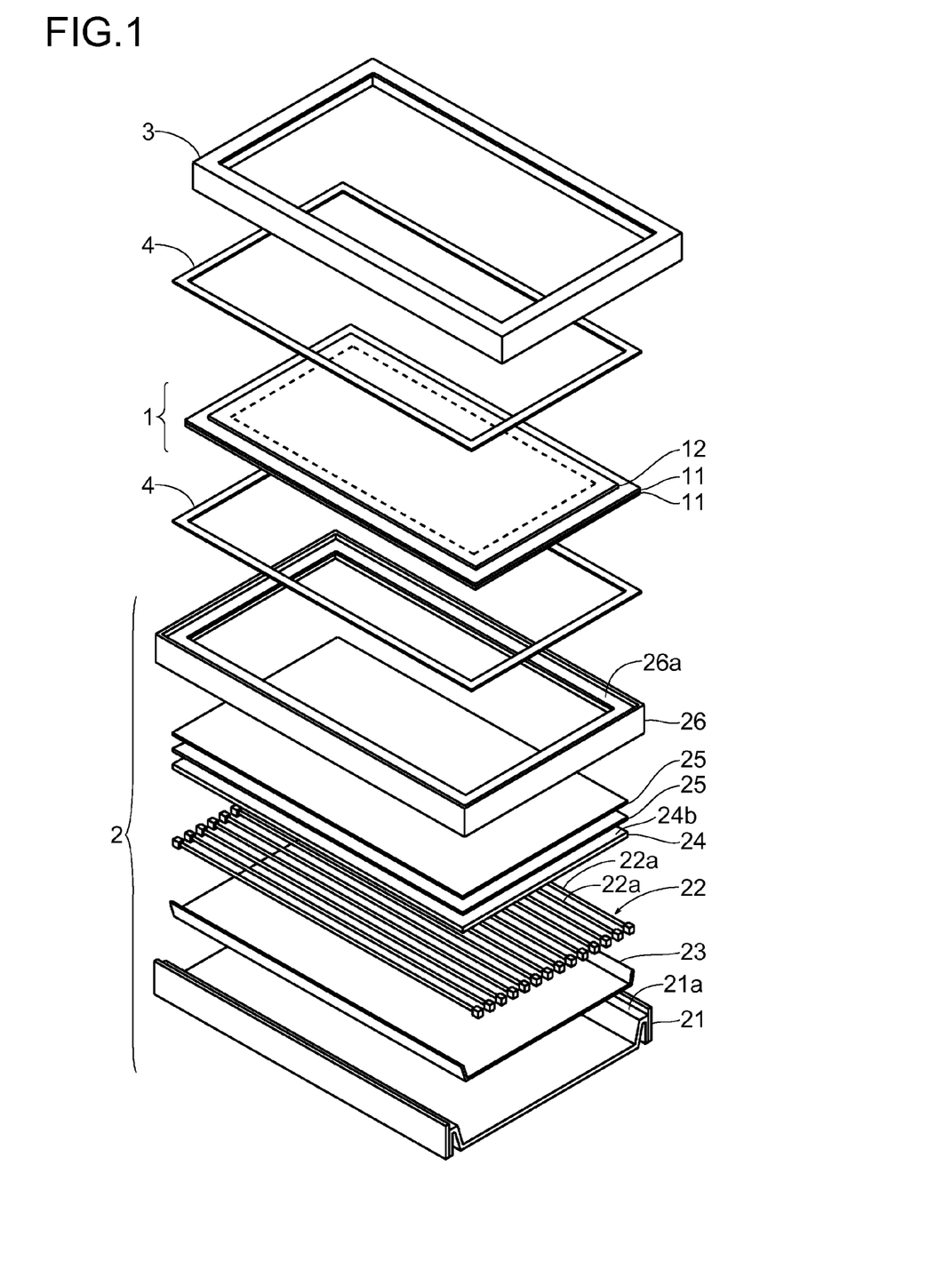
FIG. 1 An exploded perspective view of a liquid crystal display device incorporating a backlight unit according to a first embodiment.
Figure 2:
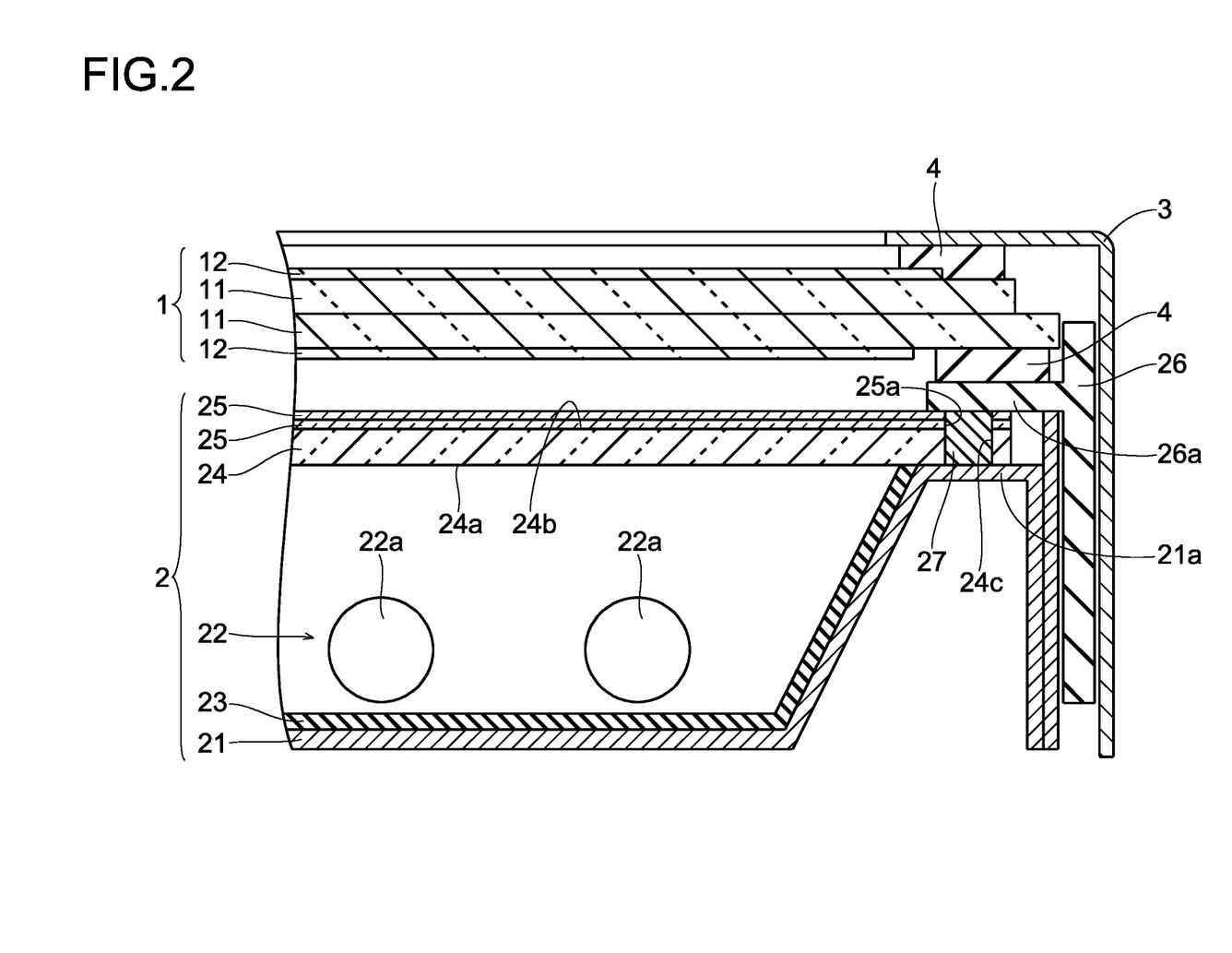
FIG. 2 A cross-sectional view of part of the backlight unit according to the first embodiment.

The display device is a liquid crystal display device, and includes, as shown in FIGS. 1 and 2, at least a liquid crystal display panel 1 and a backlight unit 2 that is provided on the back surface side opposite to the display surface side of the liquid crystal display panel 1. The display device is structured such that the display surface of the liquid crystal display panel 1 is exposed from the opening of a bezel 3 that is one of the enclosures. The optical characteristic (optical transmittance) of the liquid crystal display panel 1 is changed for each pixel, and light from the backlight unit 2 illuminates the back surface of the liquid crystal display panel 1, and thus a desired image is displayed on the display surface of the liquid crystal display panel 1. The liquid crystal display panel 1 is an example of a "display panel" according to the present invention; the backlight unit 2 is an example of an "illumination device" according to the present invention.

In the specific configuration, the liquid crystal display panel 1 includes a liquid crystal layer (not shown), a pair of transparent substrates (an active matrix substrate and an opposite substrate) 11 and polarization plates 12. The liquid crystal layer is sandwiched between the pair of transparent substrates 11, and the polarization plates 12 are arranged on the opposite surfaces of the pair of transparent substrates 11 to the side of the liquid crystal layer. An inside region surrounded by broken lines in FIG. 1 is an effective display region (region where a plurality of pixels are arranged in a matrix), and an outside region other than the effective display region is a non-display region.

The backlight unit 2 includes a back chassis 21, light source modules 22, a reflective sheet 23, a diffusion plate 24, an optical sheet 25 and a frame 26. The back chassis 21 and the frame 26 are examples of an "enclosure" according to the present invention. The light source module 22 is an example of a "light source" according to the present invention.

The back chassis 21 is concave, and has a bottom portion and a side portion provided so as to stand on the perimeter of the bottom surface. A region on the bottom surface of the back chassis 21 surrounded by the side portion, that is, the inside region of the concave portion, is a holding region. The planar shape of the holding region of the back chassis 21 is formed in the shape of a quadrangle. A flat portion 21a is formed near the upper end of the side portion of the back chassis 21, and part of the diffusion plate 24 is placed on the flat portion 21a of the back chassis 21.

The light source modules 22 include a plurality of discharge tubes 22a, and are held in the holding region of the back chassis 21. The light source modules 22 generate light for illuminating the liquid crystal display panel 1.

The reflective sheet 23 is arranged along the inner surface (the bottom surface of the bottom portion and the inside surface of the side portion) of the back chassis 22. In other words, the inner surface of the back chassis 22 is made to serve as an optically reflective surface by the reflective sheet 23. Thus, when the light generated by the light source modules 22 is incident on the inner surface of the back chassis 22, the light is not absorbed but is reflected toward the side of the liquid crystal display panel 1.

The diffusion plate 24 is formed with a plate member whose planar shape is formed in the shape of a quadrangle, and includes at least a planar surface (hereinafter referred to as a light entrance surface 24a) that is made to face the side of the back chassis 21 and a planar surface (hereinafter referred to as a light emitting surface 24b) that is an opposite surface to the light entrance surface 24a and that is made to face the side of the liquid crystal display panel 1. The diffusion plate 24 covers the light source modules 22 from the side of the liquid crystal display panel 1. Thus, the light generated by the light source modules 22 enters the light entrance surface 24a of the diffusion plate 24, is diffused and is emitted through the light emitting surface 24b of the diffusion plate 24 toward the side of the liquid crystal display panel 1. In the diffusion plate 24, its perimeter portions (portions corresponding to the non-display region) are placed on the flat portion 21a of the back chassis 21, and thus the diffusion plate 24 is retained while covering the light source modules 22 from the side of the liquid crystal display panel 1.

The optical sheet 25 is formed with a sheet member whose planar shape is formed in the shape of a quadrangle, and includes a diffusion sheet and a lens sheet. The optical sheet 25 is placed on the light emitting surface 24b of the diffusion plate 24, and performs the diffusion, the collection and the like of the light emitted from the light emitting surface 24b of the diffusion plate 24.

The frame 26 is frame-shaped so as to integrally include a frame portion 26a.

The frame portion 26a of the frame 26 is arranged on the perimeter portions of the diffusion plate 24 (the optical sheet 25), and presses the perimeter portions of the diffusion plate 24 (the optical sheet 25). In other words, the perimeter portions of the diffusion plate 24 (the optical sheet 25) are sandwiched between the flat portion 21a of the back chassis 21 and the frame portion 26a of the frame 26.

Then, the perimeter portions of the liquid crystal display panel 1 are placed on the frame portion 26a of the frame 26, and thus the backlight unit 2 is arranged on the back surface side of the liquid crystal display panel 1. The perimeter portions of the liquid crystal display panel 1 are sandwiched between a pair of cushion members 4.

Figure 3:
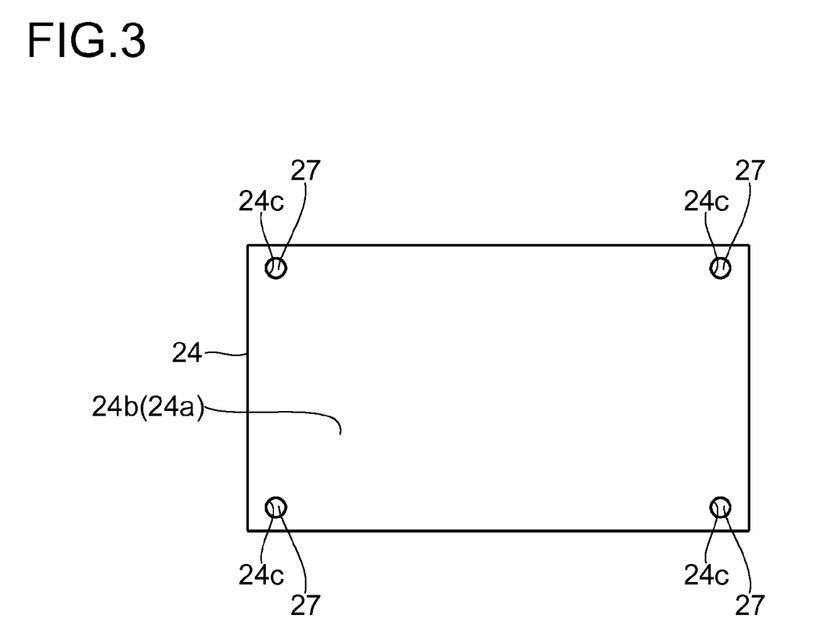
FIG. 3 A plan view of a diffusion plate incorporated in the backlight unit shown in FIG. 2.

In the first embodiment, as shown in FIGS. 2 and 3, when seen in plan view from the side of the light emitting surface 24b of the diffusion plate 24, a concave portion is formed in the perimeter portions (portions sandwiched between the flat portion 21a of the back chassis 21 and the frame portion 26a of the frame 26) of the diffusion plate 24 on the side of the light emitting surface 24b. When seen in plan view from the side of the light entrance surface 24a of the diffusion plate 24, a concave portion is also formed in the perimeter portions of the diffusion plate 24 on the side of the light entrance surface 24a. The concave portion formed in the perimeter portions of the diffusion plate 24 on the side of the light emitting surface 24b and the concave portion formed in the perimeter portions on the side of the light entrance surface 24a are coupled to each other in the direction of plate thickness to form a through hole.

In other words, in the first embodiment, in the perimeter portions of the diffusion plate 24 on the side of the light emitting surface 24b, the though hole penetrating from the side of the light emitting surface 24b to the side of the light entrance surface 24a is formed. The though hole of the diffusion plate 24 is made to serve as a diffusion plate fixing portion 24c.

When seen in plan view from the side of the light emitting surface 24b, one diffusion plate fixing portion (through hole) 24c of the diffusion plate 24 (the total is four) is arranged in each corner portion of the light emitting surface 24b. In other words, in each of the perimeter portions on the side of a pair of sides of the light emitting surface 24b of the diffusion plate 24 that are parallel to each other, two diffusion plate fixing portions (through holes) 24c are arranged; the positions where the diffusion plate fixing portions (through holes) 24c are arranged in the perimeter portions on the side of one side are symmetric with the positions where the diffusion plate fixing portions (through holes) 24c are arranged in the perimeter portions on the side of the other side. The planar shapes of the diffusion plate fixing portions (through holes) 24c of the diffusion plate 24 are all the same.

Furthermore, opening portions 25a are formed in the optical sheet 25, and the opening portions 25a of the optical sheet 25 are arranged in portions superimposed on the diffusion plate fixing portions (through holes) 24c of the diffusion plate 24. Hence, although the optical sheet 25 is placed on the light emitting surface 24b of the diffusion plate 24, the diffusion plate fixing portions (through holes) 24c of the diffusion plate 24 are exposed through the opening portions 25a of the optical sheet 25.

In the first embodiment, fixing pins 27 are inserted into the diffusion plate fixing portions (through holes) 24c of the diffusion plate 24 (which includes the press-fitting of the fixing pins 27 thereinto), and thus the diffusion plate fixing portions (through holes) 24c of the diffusion plate 24 are engaged with the fixing pins 27, with the result that the perimeter portions of the diffusion plate 24 are fixed. The fixing pin 27 is an example of a "fixing member" and a "pin member" according to the present invention.

Specifically, the fixing pin 27 has an engagement portion formed cylindrically, and the shape of the opening of the diffusion plate fixing portion (through hole) 24c of the diffusion plate 24 is formed (in a circular shape) to correspond to the shape of the engagement portion of the fixing pin 27. The cylindrically shaped engagement portion of the fixing pin 27 is inserted into the diffusion plate fixing portion (through hole) 24c of the diffusion plate 24 that is open in a circular shape.

The fixing pin 27 inserted into the diffusion plate fixing portion (through hole) 24c of the diffusion plate 24 fully penetrates the diffusion plate 24 in the direction of the plate thickness. In other words, the lower end portion (portion on the side of the flat portion 21a of the back chassis 21) of the fixing pin 27 is exposed from the diffusion plate fixing portion (through hole) 24c of the diffusion plate 24 to the side of the light entrance surface 24a, and reaches the flat portion 21a of the back chassis 21. The upper end portion (portion on the side of the frame portion 26a of the frame 26) of the fixing pin 27 is exposed from the diffusion plate fixing portion (through hole) 24c of the diffusion plate 24 to the side of the light emitting surface 24b, and further reaches the frame portion 26a of the frame 26 through the opening portions 25a of the optical sheet 25.

The fixing pin 27 may be separately added to the flat portion 21a of the back chassis 21 or may be formed integrally on the flat portion 21a of the back chassis 21. Furthermore, the fixing pin 27 may be separately added to the frame portion 26a of the frame 26 or may be formed integrally on the frame portion 26a of the frame 26.

In the first embodiment, since, in the configuration described above, the fixing pins 27 are engaged with the diffusion plate fixing portions 24c of the diffusion plate 24, the unintentional movement and deformation of the diffusion plate 24 are regulated. In other words, the diffusion plate 24 is rigidly fixed, and thus the position of the diffusion plate 24 is unlikely to be displaced. In this way, it is possible to reduce the coming off of the diffusion plate 24 from a desired installation place, the generation of variations in brightness and the like.

In the first embodiment, even when, as described above, the opening portions 25a are formed in the optical sheet 25 placed on the light emitting surface 24b of the diffusion plate 24, the diffusion plate fixing portions 24c of the diffusion plate 24 are exposed from the opening portions 25a of the optical sheet 25 and thus the optical sheet 25 is placed on the light emitting surface 24b of the diffusion plate 24, the fixing pins 27 can be engaged with the diffusion plate fixing portions 24c of the diffusion plate 24. It is also possible to fix the optical sheet 25.

In the first embodiment, as described above, the fixing pins 27 are provided on either of the flat portion 21 a of the back chassis 21 and the frame portion 26a of the frame 26, and thus it is possible to facilitate the engagement of the fixing pins 27 with the diffusion plate fixing portions 24c of the diffusion plate 24.

In the first embodiment, as described above, the diffusion plate fixing portions 24c of the diffusion plate 24 are made to serve as the through holes, and the fixing pins 27 are inserted into the diffusion plate fixing portions 24c of the diffusion plate 24, and thus it is possible to easily engage the diffusion plate fixing portions 24c of the diffusion plate 24 with the fixing pins 27. Furthermore, since the fixing pin 27 fully penetrates the diffusion plate fixing portion 24c of the diffusion plate 24, and thus the area of the engagement of the diffusion plate fixing portion 24c of the diffusion plate 24 with the fixing pin 27 is increased, it is possible to easily and more rigidly fix the diffusion plate 24.

In the first embodiment, as described above, in each of the perimeter portions on the side of the pair of sides of the light emitting surface 24b of the diffusion plate 24 that are parallel to each other, two diffusion plate fixing portions 24c are arranged, and thus it is possible to rigidly fix the diffusion plate 24 in a reliable and balanced way.

Figure 4:
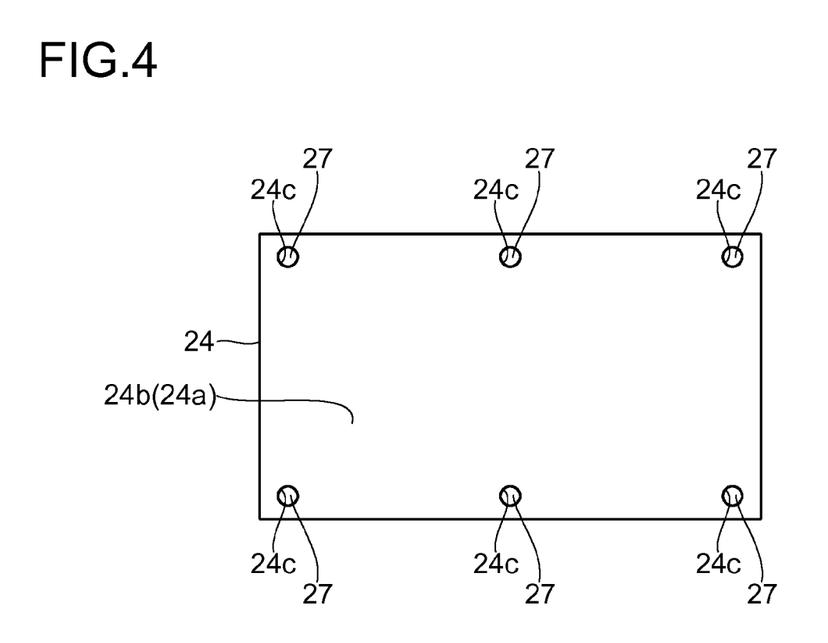
FIG. 4 A plan view of a diffusion plate incorporated in a backlight unit according to a variation of the first embodiment.

In the configuration of the first embodiment, as shown in FIG. 4, one diffusion plate fixing portion 24c may be added to each of the perimeter portions on the side of the pair of sides of the light emitting surface 24b of the diffusion plate 24 that are parallel to each other, and the added diffusion plate fixing portions 24c may be arranged near the centers of the perimeter portions on the side of the pair of sides of the diffusion plate 24 that are parallel to each other. Thus, it is possible to reliably fix the center portion of the diffusion plate 24. Hence, the configuration of the variation described above is effective for a case where a large-sized diffusion plate 24 in which its center portion is easily bent is used.

Figure 5:
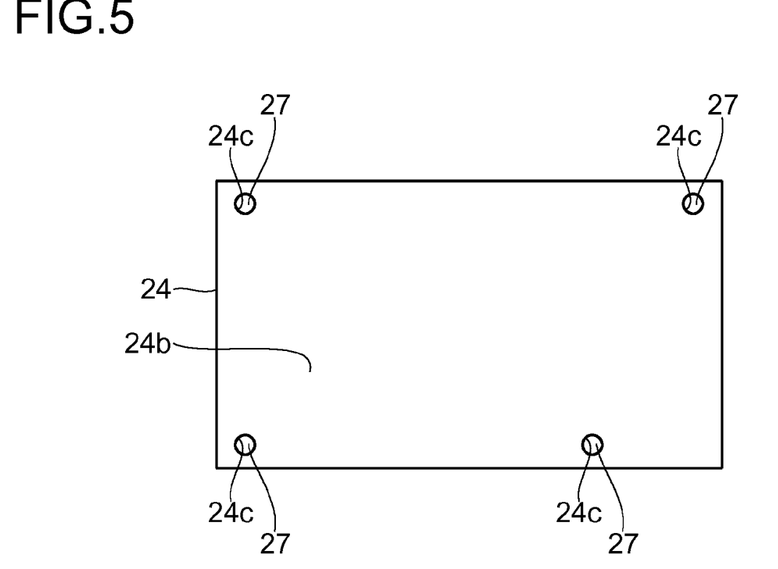
FIG. 5 A plan view of a diffusion plate incorporated in a backlight unit according to a variation of the first embodiment.

In the configuration of the first embodiment, as shown in FIG. 5, the positions where the diffusion plate fixing portions 24c are arranged in the perimeter portions on the side of one side of the light emitting surface 24b of the diffusion plate 24 and the positions where the diffusion plate fixing portions 24c are arranged in the perimeter portions on the side of the other side may be displaced from each other. In this way, it is possible to determine, from the positions where the diffusion plate fixing portions 24c of the diffusion plate 24 are arranged, the front and back of the diffusion plate 24. Hence, the front and back of the diffusion plate 24 are unlikely to be erroneously used when an assembly operation is performed.

Figure 6:
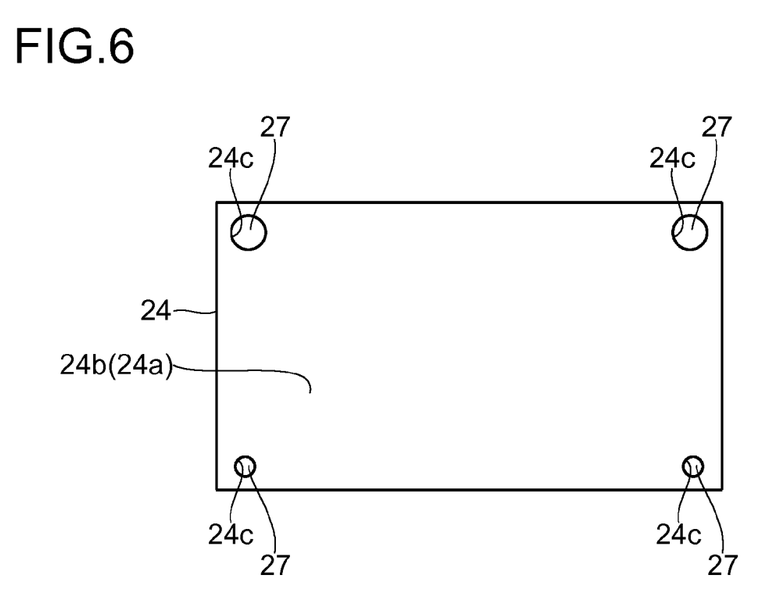
FIG. 6 A plan view of a diffusion plate incorporated in a backlight unit according to a variation of the first embodiment.

In the configuration of the first embodiment, as shown in FIG. 6, among a plurality of diffusion plate fixing portions 24c of the diffusion plate 24, the area of the opening of a predetermined diffusion plate fixing portions 24c may be increased as compared with the area of the opening of the other diffusion plate fixing portions 24c, and the diameter of a fixing pin 27 that is inserted into the predetermined diffusion plate fixing portion 24c of the diffusion plate 24 may be further increased accordingly. In other words, the area of the engagement of the predetermined diffusion plate fixing portion 24c of the diffusion plate 24 with the fixing pin 27 may be increased as compared with the area of the engagement of the other diffusion plate fixing portions 24c with the fixing pins 27. In this way, for example, even if strong vibrations are produced on the side of one side of the light emitting surface 24b of the diffusion plate 24, the predetermined diffusion plate fixing portion 24c having the larger area of the opening (the area of the engagement) is arranged in the perimeter portion on the side of the one side of the light emitting surface 24b of the diffusion plate 24, and thus it is possible to reduce the possibility that the position of the diffusion plate 24 is displaced.

In the configuration of the first embodiment, although not shown, enclosure fixing screws used for fixing the enclosure may be engaged with the diffusion plate fixing portions 24c of the diffusion plate 24. In other words, the "fixing member" according to the present invention may be the enclosure fixing screw.

Second Embodiment

Figure 7:
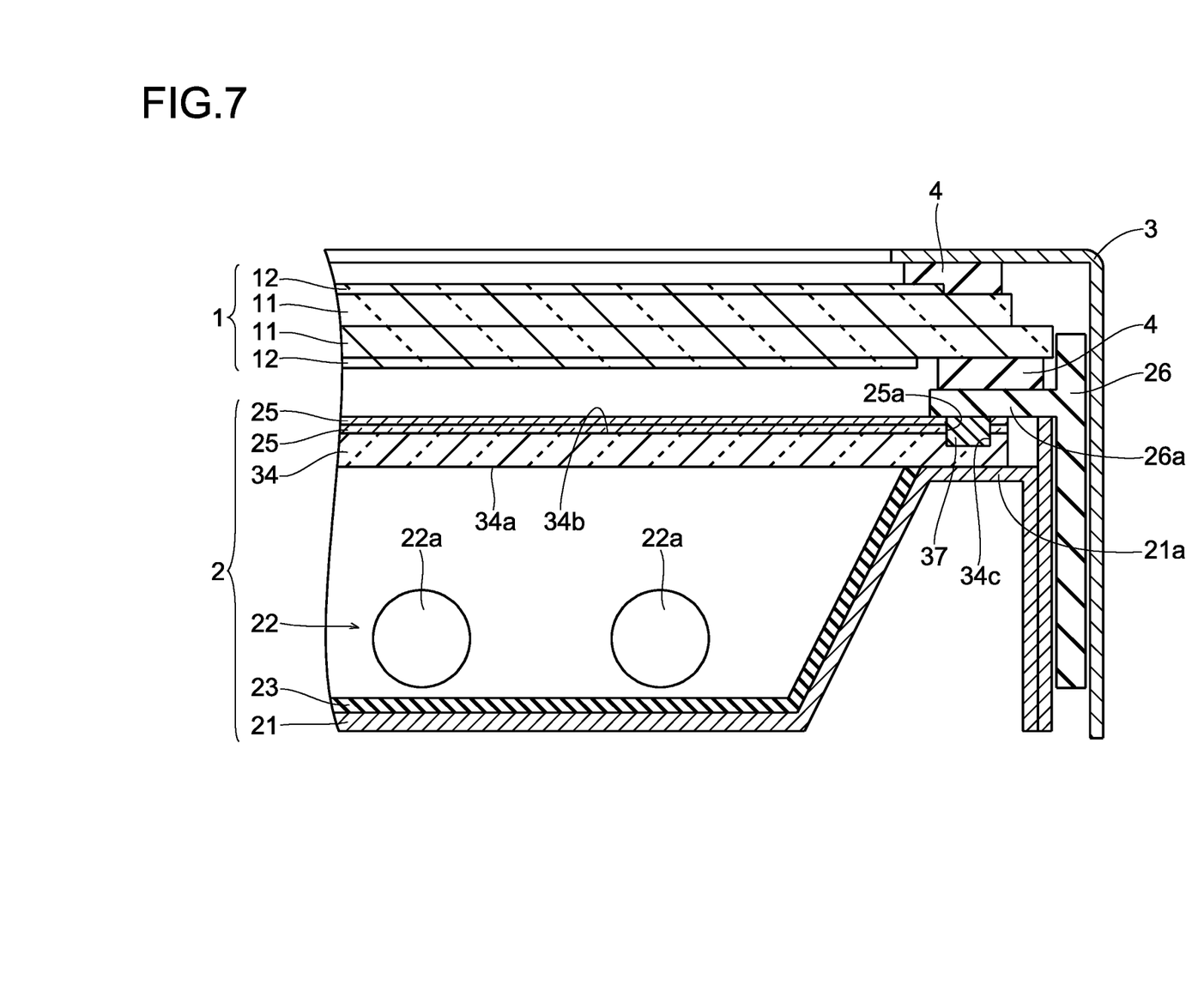
FIG. 7 A cross-sectional view of part of a backlight unit according to a second embodiment.

The configuration of a second embodiment will now be described in detail with reference to FIG. 7.

In the second embodiment, while a diffusion plate 34 having the same function as the diffusion plate 24 (see FIG. 2) of the first embodiment is used, the method of fixing it differs from that in the first embodiment.

Specifically, in the second embodiment, the concave portions are not formed in the perimeter portions of the diffusion plate 34 on the side of the light entrance surface 34a, the concave portions are formed only in the perimeter portions of the diffusion plate 34 on the side of the light emitting surface 34b and the concave portions of the diffusion plate 34 on the side of the light emitting surface 34b are made to serve as the diffusion plate fixing portions 34c. In other words, the diffusion plate fixing portions (concave portions) 34c of the diffusion plate 34 do not penetrate in the direction of the plate thickness. The positions where the diffusion plate fixing portions (concave portions) 34c of the diffusion plate 34 are arranged are preferably the same as in the first embodiment or in the variation.

In the second embodiment, fixing pins 37 (corresponding to an example of the "fixing member" and the "pin member" according to the present invention) are provided on the flat portion 26a of the frame 26, and the fixing pins 37 are inserted into the diffusion plate fixing portions (concave portions) 34c of the diffusion plate 34 (which includes the press-fitting of the fixing pins 37 thereinto). Thus the diffusion plate fixing portions (concave portions) 34c of the diffusion plate 34 are engaged with the fixing pins 37, and thus the perimeter portions of the diffusion plate 34 are fixed.

Since the other configurations in the second embodiment are the same as in the first embodiment, their description will not be repeated.

In the second embodiment configured as described above, although the area of the engagement of the diffusion plate fixing portions 34c of the diffusion plate 34 with the fixing pins 37 is reduced as compared with the first embodiment, substantially the same effects as in the first embodiment can be obtained.

In the second embodiment, as described above, the diffusion plate fixing portions are not formed in the perimeter portions of the diffusion plate 34 on the side of the light entrance surface 34a, and the diffusion plate fixing portions 34c are formed only in the perimeter portions of the diffusion plate 34 on the side of the light emitting surface 34b, with the result that the determination of the front and back of the diffusion plate 34 is easily performed and that the front and back of the diffusion plate 24 are unlikely to be erroneously used when an assembly operation is performed.

Third Embodiment

Figure 8:
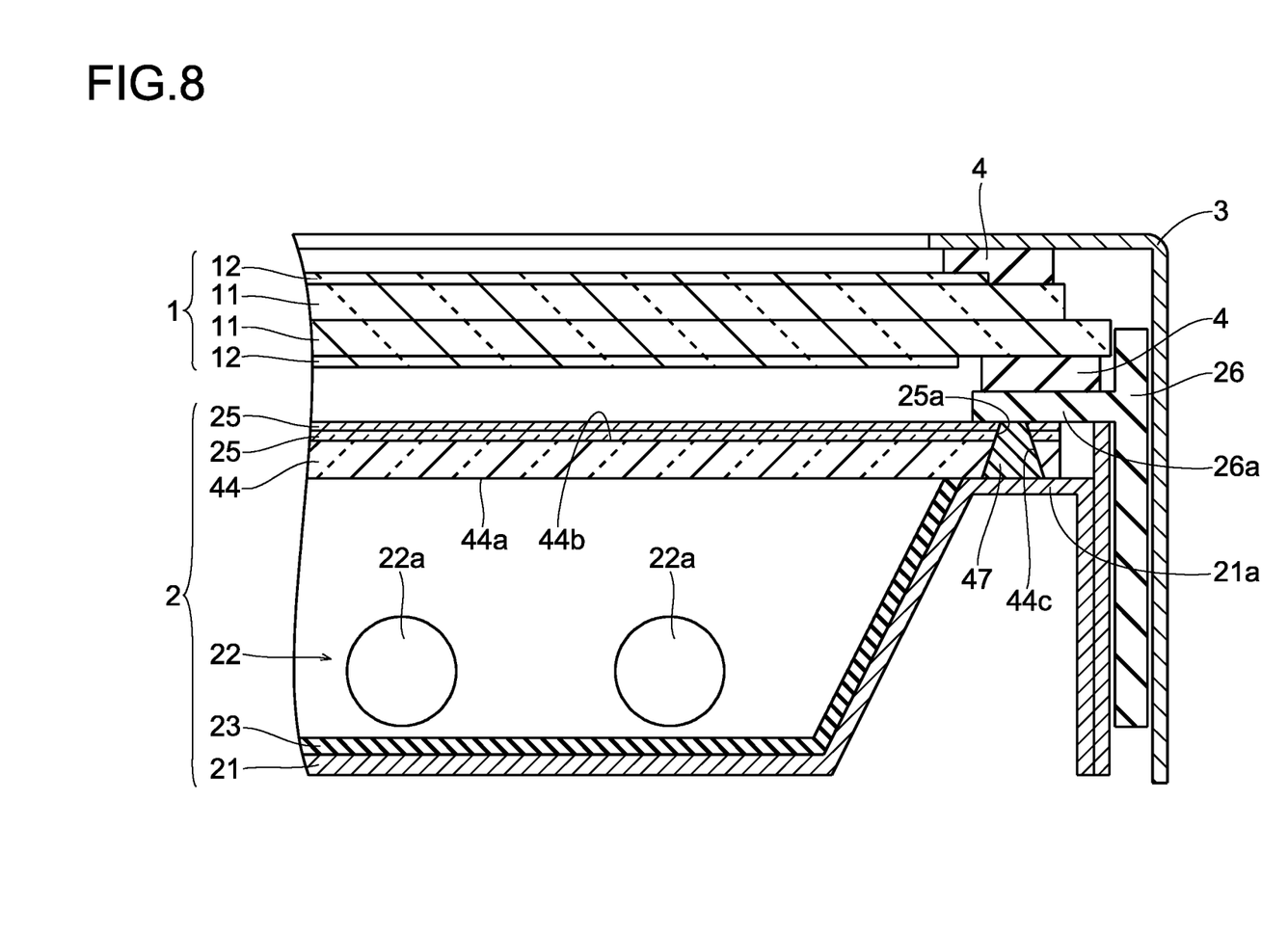
FIG. 8 A cross-sectional view of part of a backlight unit according to a third embodiment.

The configuration of a third embodiment will now be described in detail with reference to FIG. 8.

In the third embodiment, while a diffusion plate 44 having the same function as the diffusion plate 24 (see FIG. 2) of the first embodiment is used, the method of fixing it differs from that in the first embodiment.

Specifically, in the third embodiment, through holes having a width of its opening that is gradually narrowed from the side of a light entrance surface 44a to the side of a light emitting surface 44b are formed in the perimeter portions of the diffusion plate 44, and the through holes formed in the perimeter portions of the diffusion plate 44 are made to serve as diffusion plate fixing portions 44c. The positions where the diffusion plate fixing portions (through holes) 44c of the diffusion plate 44 are arranged are preferably the same as in the first embodiment or in the variation.

In the third embodiment, fixing pins 47 are provided on the flat portion 21a of the back chassis 21, and the fixing pins 47 taper (are formed substantially in the shape of a cone) from a base end portion (portion on the side of the flat portion 21a of the back chassis 21) toward a top end portion. In other words, the fixing pin 47 is made to function as a wedge. The fixing pin 47 is an example of the "fixing member" and the "pin member" according to the present invention.

In the third embodiment, since the fixing pins 47 are inserted into the diffusion plate fixing portions (through holes) 44c of the diffusion plate 44 (which includes the press-fitting of the fixing pins 47 thereinto), and the fixing pins 47 are wedge-shaped, it appears as if the wedges are practically inserted into the diffusion plate fixing portions (through holes) 44c of the diffusion plate 44. Thus the diffusion plate fixing portions (through holes) 44c of the diffusion plate 44 are engaged with the fixing pins 47, and thus the perimeter portions of the diffusion plate 44 are fixed.

Since the other configurations in the third embodiment are the same as in the first embodiment, their description will not be repeated.

In the third embodiment configured as described above, the same effects as in the first embodiment can be obtained.

In the third embodiment, as described above, since the fixing pins 47 taper, and thus it appears as if the wedges are inserted into the diffusion plate fixing portions 44c of the diffusion plate 44, the diffusion plate 44 is very rigidly fixed.

Fourth Embodiment

Figure 9:
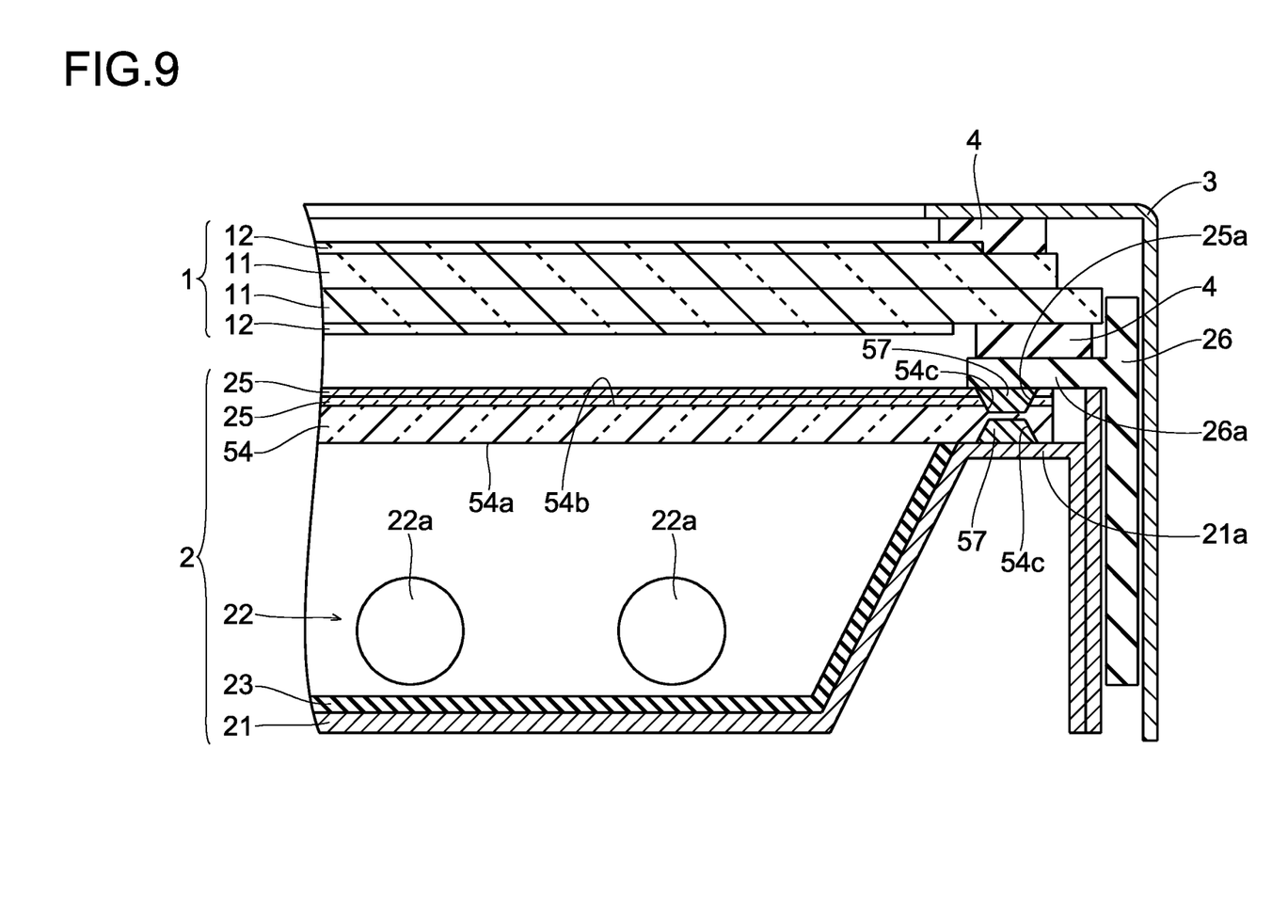
FIG. 9 A cross-sectional view of part of a backlight unit according to a fourth embodiment.

The configuration of a fourth embodiment will now be described in detail with reference to FIG. 9.

In the fourth embodiment, while a diffusion plate 54 having the same function as the diffusion plate 24 (see FIG. 2) of the first embodiment is used, the method of fixing it differs from that in the first embodiment.

Specifically, in the fourth embodiment, although the concave portions are formed both in the perimeter portions of the diffusion plate 54 on the side of a light entrance surface 54a and in the perimeter portions on the side of a light emitting surface 54b, the concave portions of the diffusion plate 54 on the side of the light entrance surface 54a and the concave portions on the side of the light emitting surface 54b are not coupled to each other, and they do not form through holes. In the concave portion of the diffusion plate 54 on the side of the light entrance surface 54a, the width of its opening is gradually narrowed as it extends away from the light entrance surface 54a; in the concave portion of the diffusion plate 54 on the side of the light emitting surface 54b, the width of its opening is gradually narrowed as it extends away from the light emitting surface 54b. The concave portion of the diffusion plate 54 on the side of the light entrance surface 54a and the concave portion on the side of the light emitting surface 54b are made to serve as diffusion plate fixing portions 54c. The positions where the diffusion plate fixing portions (concave portions) 54c of the diffusion plate 54 are arranged are preferably the same as in the first embodiment or in the variation.

Furthermore, in the fourth embodiment, fixing pins 57 are provided both on the flat portion 21a of the back chassis 21 and on the frame portion 26a of the frame 26, and the fixing pins 57 are made to function as wedges. In other words, the fixing pins 57 formed on the flat portion 21a of the back chassis 21 taper (are formed substantially in the shape of a cone) from the base end portion (portion on the side of the flat portion 21a of the back chassis 21) toward the top end portion; the fixing pins 57 formed on the frame portion 26a of the frame 26 taper (are formed substantially in the shape of a cone) from the base end portion (portion on the side of the frame portion 26a of the frame 26) toward the top end portion. The fixing pin 57 is an example of the "fixing member" and the "pin member" according to the present invention.

In the fourth embodiment, since the fixing pins 57 formed on the flat portion 21a of the back chassis 21 are inserted into the diffusion plate fixing portions (concave portions) 54c of the diffusion plate 54 on the side of the light entrance surface 54a (which includes the press-fitting of the fixing pins 57 thereinto), and the fixing pins 57 formed on the frame portion 26a of the frame 26 are inserted into the diffusion plate fixing portions (concave portions) 54c of the diffusion plate 54 on the side of the light emitting surface 54b (which includes the press-fitting of the fixing pins 57 thereinto). In other words, it appears as if the wedges are inserted both into the diffusion plate fixing portions (concave portions) 54c of the diffusion plate 54 on the side of the light entrance surface 54a and into the diffusion plate fixing portions (concave portions) 54c on the side of the light emitting surface 54b. Thus, the fixing pins 57 are engaged with both the diffusion plate fixing portions (concave portions) 54c of the diffusion plate 54 on the side of the light entrance surface 54a and the diffusion plate fixing portions (concave portions) 54c on the side of the light emitting surface 54b, and thus the perimeter portions of the diffusion plate 54 are fixed.

Since the other configurations in the fourth embodiment are the same as in the first embodiment, their description will not be repeated.

In the fourth embodiment configured as described above, the same effects as in the first embodiment can be obtained.

In the fourth embodiment, as described above, since the fixing pins 57 taper, and, as in the third embodiment, it appears as if the wedges are inserted into the diffusion plate fixing portions 54c of the diffusion plate 54, the diffusion plate 54 is very rigidly fixed.

Fifth Embodiment

Figure 10:
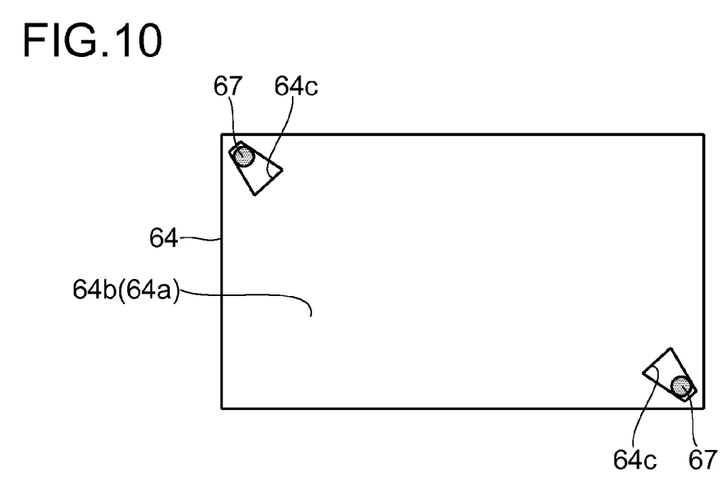
FIG. 10 A plan view of a diffusion plate incorporated in a backlight unit according to a fifth embodiment.

In a fifth embodiment, a diffusion plate 64 as shown in FIG. 10 is used. Specifically, diffusion plate fixing portions (concave portions including through holes) 64c are formed at least in the perimeter portions on the side of a light emitting surface 64b among the light entrance surface 64a and the light emitting surface 64b of the diffusion plate 64; one diffusion plate fixing portion 64c is arranged in each of a pair of corner portions arranged on a predetermined diagonal line of the light emitting surface 64b. When seen in plan view from the side of the light emitting surface 64b, the diffusion plate fixing portion 64c of the diffusion plate 64 includes a wide width portion having a wide width of its opening and a narrow width portion having a narrow width of its opening.

In the fifth embodiment, fixing pins 67 (corresponding to an example of the "fixing member" and the "pin member" according to the present invention) are movably provided with respect to the flat portion 21a (see FIG. 2) of the back chassis 21 or the frame portion 26a (see FIG. 2) of the frame 26, and the fixing pins 67 are inserted into the narrow width portions of the diffusion plate fixing portions 64c of the diffusion plate 64. In this way, the narrow width portions of the diffusion plate fixing portions 64c of the diffusion plate 64 are engaged with the fixing pins 67, and thus the perimeter portions of the diffusion plate 64 are fixed.

Figure 11:
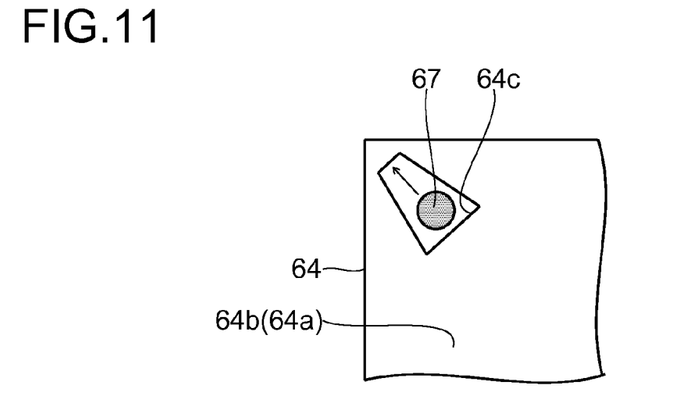
FIG. 11 A diagram illustrating a method of fixing the diffusion plate shown in FIG. 10.
Figure 12:
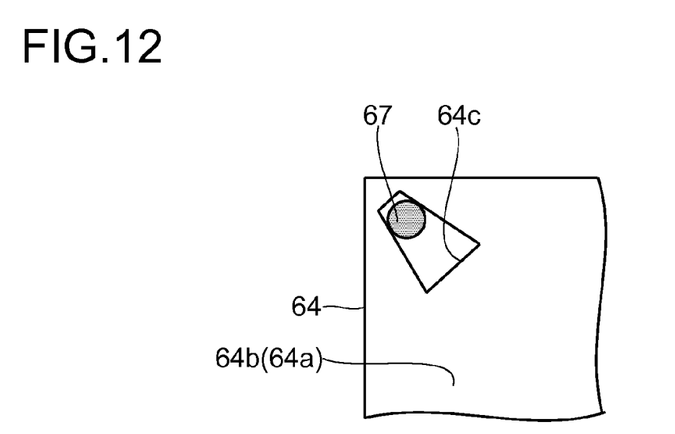
FIG. 12 A diagram illustrating the method of fixing the diffusion plate shown in FIG. 10.

Incidentally, in the fifth embodiment, as shown in FIGS. 11 and 12, the fixing pin 67 is inserted into the wide width portion of the diffusion plate fixing portions 64c of the diffusion plate 64, and is thereafter moved to the narrow width portion of the diffusion plate fixing portion 64c, with the result that the narrow width portion of the diffusion plate fixing portion 64c of the diffusion plate 64 is engaged with the fixing pin 67. Furthermore, a tensile stress remains applied to the diffusion plate 64.

In the fifth embodiment configured as described above, the same effects as in the first embodiment can be obtained.

In the fifth embodiment, as described above, the tensile stress remains applied to the diffusion plate 64, and thus the diffusion plate 64 is more rigidly fixed.

Sixth Embodiment

Figure 13:
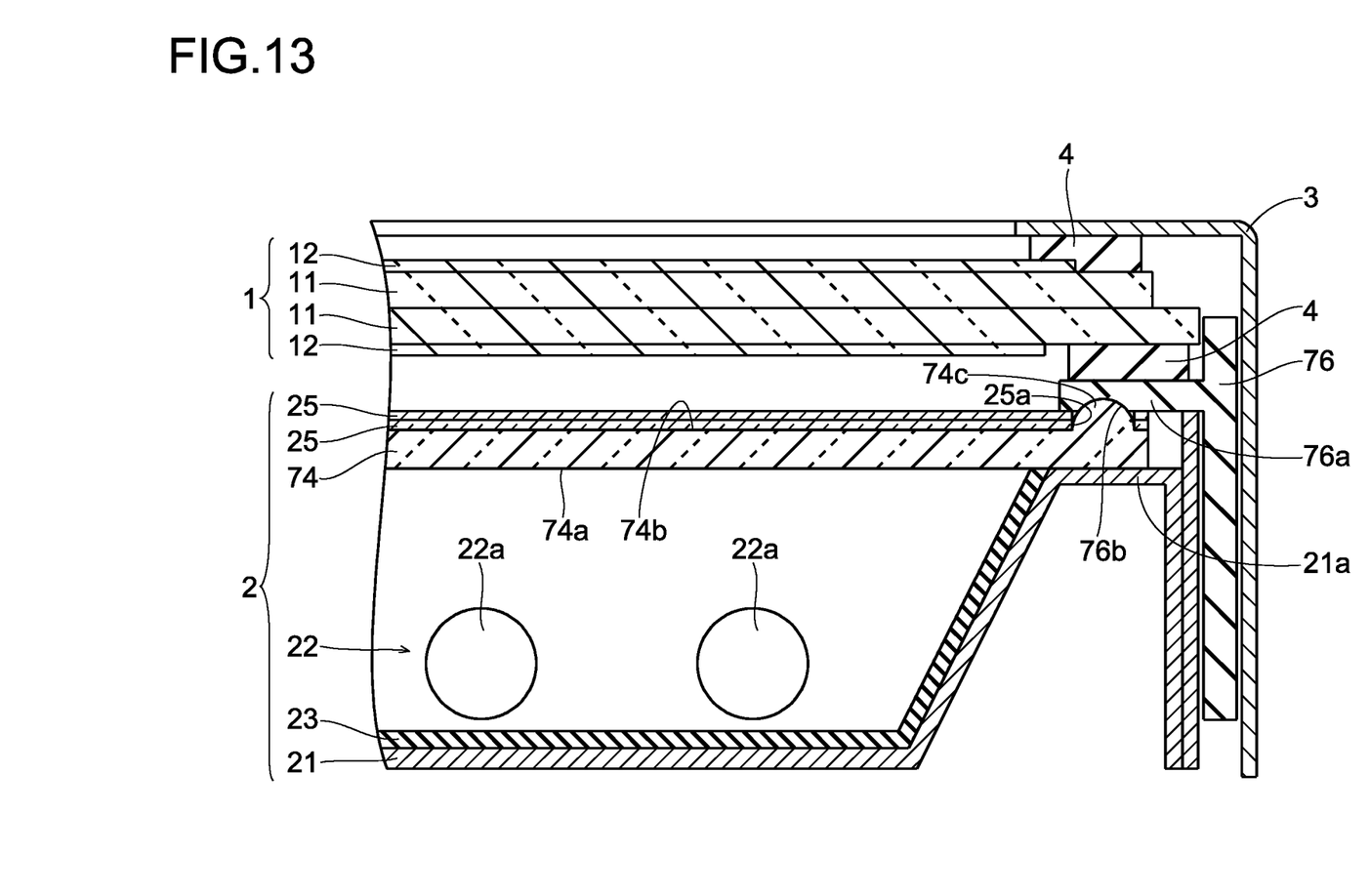
FIG. 13 A cross-sectional view of part of a backlight unit according to a sixth embodiment.

The configuration of a sixth embodiment will now be described in detail with reference to FIG. 13.

In the sixth embodiment, while a diffusion plate 74 having the same function as the diffusion plate 24 (see FIG. 2) of the first embodiment is used, the method of fixing it differs from that in the first embodiment.

Specifically, in the sixth embodiment, convex portions are formed only in the perimeter portions on the side of a light emitting surface 74b among the light entrance surface 74a and the light emitting surface 74b of the diffusion plate 74, and the convex portions of the diffusion plate 74 on the side of the light emitting surface 74b are made to serve as diffusion plate fixing portions 74c. The diffusion plate fixing portions (convex portions) 74c of the diffusion plate 74 are exposed through the opening portions 25a of the optical sheet 25. The positions where the diffusion plate fixing portions (convex portions) 74c of the diffusion plate 74 are arranged are preferably the same as in the first embodiment or in the variation.

Here, in the sixth embodiment, the perimeter portions of the diffusion plate 74 (the optical sheet 25) are pressed by the frame portion 76a of a frame 76, and the diffusion plate fixing portions (convex portions) 74c of the diffusion plate 74 are inserted into concave insertion portions 76b formed in the frame portion 76a of the frame 76 (which includes the press-fitting of the diffusion plate fixing portions 74c thereinto). Thus, the diffusion plate fixing portions (convex portions) 74c of the diffusion plate 74 are engaged with the insertion portions 76b of the frame 76, and thus the perimeter portions of the diffusion plate 74 are fixed. In this embodiment, the frame portion 76a of the frame 76 where the insertion portion 76b is formed is an example of the "fixing member" according to the present invention.

Figure 14:
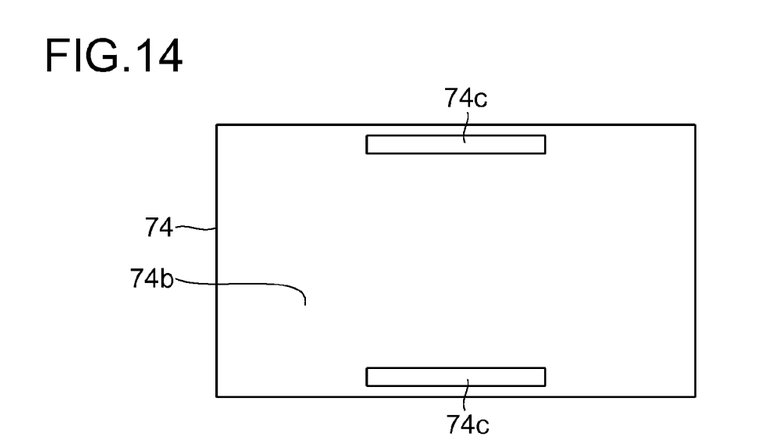
FIG. 14 A plan view illustrating positions where diffusion plate fixing portions of a diffusion plate incorporated in the backlight unit shown in FIG. 13 are arranged and the planar shape thereof.
Figure 15:
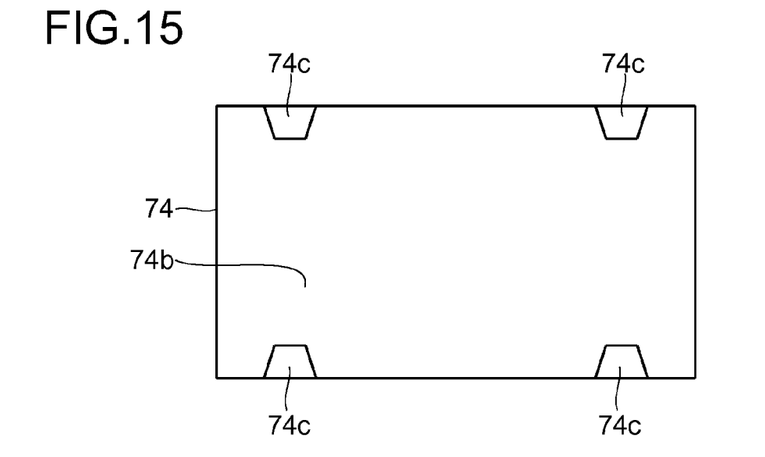
FIG. 15 A plan view illustrating positions where diffusion plate fixing portions of the diffusion plate incorporated in the backlight unit shown in FIG. 13 are arranged and the planar shape thereof.
Figure 16:
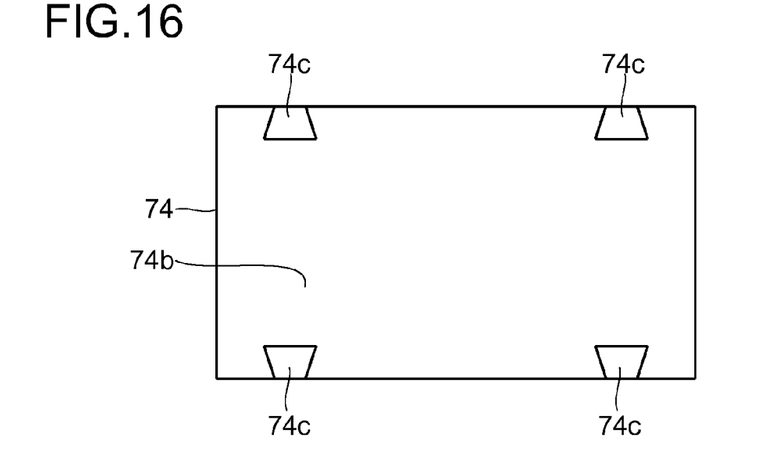
FIG. 16 A plan view illustrating positions where diffusion plate fixing portions of a diffusion plate incorporated in the backlight unit shown in FIG. 13 are arranged and the planar shape thereof.

Incidentally, the planar shape of the diffusion plate fixing portion (convex portion) 74c of the diffusion plate 74 is not particularly limited; it may be formed in any shape. For example, as shown in FIG. 14, the planar shape of the diffusion plate fixing portion (convex portion) 74c of the diffusion plate 74 may be formed in the shape of a quadrangle; as shown in FIGS. 15 and 16, the planar shape of the diffusion plate fixing portion (convex portion) 74c of the diffusion plate 74 may be formed in the shape of a wedge. Although not shown, the planar shape of the diffusion plate fixing portion (convex portion) 74c of the diffusion plate 74 may be formed in the shape of a triangle (including an approximate triangle) or may be formed in the shape of a circle. Furthermore, the cross-sectional shape of the diffusion plate fixing portion (convex portion) 74c of the diffusion plate 74 is also not particularly limited.

In the sixth embodiment, in the configuration described above, the same effects as in the first embodiment can be obtained.

Although not shown, in the configuration of the sixth embodiment, the diffusion plate fixing portions 74c of the diffusion plate 74 may be configured such that they are removable.

It should be considered that the embodiment disclosed herein is illustrative in all respects and not restrictive. The scope of the present invention is indicated not by the description of the embodiment discussed above but by the scope of claims; furthermore, the scope of the present invention includes meanings equivalent to the scope of claims and all modifications within the scope.

For example, although, in the above embodiment, the example where the present invention is applied to the liquid crystal display device serving as the display device has been described, the present invention is not limited to this configuration, and the present invention can be applied to display devices other than the liquid crystal display device.

LIST OF REFERENCE SYMBOLS

1 liquid crystal display device (display panel)
2 backlight unit (illumination device)
21 back chassis (enclosure)
21a flat portion
22 light source module (light source)
24, 34, 44, 54, 64, 74 diffusion plate
24a, 34a, 44a, 54a, 64a, 74a light entrance surface
24b, 34b, 44b, 54b, 64b, 74b light emitting surface
24c, 34c, 44c, 54c, 64c, 74c diffusion plate fixing portion
25 optical sheet
25a opening portion
26, 76 frame (enclosure)
26a frame portion
27, 37, 47, 57, 67 fixing pin (fixing member)
76a frame portion (fixing member)
76b insertion portion

The invention claimed is:

1. An illumination device comprising:
a diffusion plate which includes a light entrance surface and a light emitting surface that is an opposite surface to the light entrance surface, and in which light entering the light entrance surface is diffused and is emitted through the light emitting surface; and
a fixing member which fixes the diffusion plate,
wherein, when seen in plan view from a side of the light emitting surface of the diffusion plate, a diffusion plate fixing portion formed with a concave portion or a convex portion is provided in a predetermined portion on the side of the light emitting surface of the diffusion plate, and
the fixing member is engaged with the diffusion plate fixing portion.

2. The illumination device of claim 1,
wherein an optical sheet is placed on the light emitting surface of the diffusion plate, and
an opening portion for exposing the diffusion plate fixing portion is provided in the optical sheet.

3. The illumination device of claim 1,
wherein the diffusion plate is retained by an enclosure, and the fixing member is provided in a portion of the enclosure.

4. The illumination device of claim 1,
wherein the diffusion plate fixing portion is formed with the concave portion, and
a pin member that can be inserted into the diffusion plate fixing portion is the fixing member.

5. The illumination device of claim 4,
wherein, when seen in plan view from a side of the light entrance surface of the diffusion plate, the diffusion plate fixing portion is also provided in a predetermined portion on the side of the light entrance surface of the diffusion plate.

6. The illumination device of claim 5,
wherein the diffusion plate fixing portion is a through hole that penetrates from the side of the light emitting surface of the diffusion plate to the side of the light entrance surface.

7. The illumination device of claim 4,
wherein the fixing member is the pin member that tapers.

8. The illumination device of claim 1,
wherein the diffusion plate fixing portion is formed with the convex portion, and
an insertion portion into which the diffusion plate fixing portion can be inserted is formed in the fixing member.

9. The illumination device of claim 1,
wherein the diffusion plate fixing portion includes a plurality of diffusion plate fixing portions.

10. The illumination device of claim 9,
wherein a planar shape of the diffusion plate is formed in a shape of a quadrangle, and
at least one of the diffusion plate fixing portions is arranged in each of perimeter portions of the light emitting surface of the diffusion plate on a side of a pair of sides that are parallel to each other.

11. The illumination device of claim 10,
wherein two or more of the diffusion plate fixing portions are arranged in each of the perimeter portions of the light emitting surface of the diffusion plate on the side of the pair of sides that are parallel to each other.

12. The illumination device of claim 10,
wherein a position where the diffusion plate fixing portion is arranged in the perimeter portion of the light emitting surface of the diffusion plate on a side of one side and a position where the diffusion plate fixing portion is arranged in the perimeter portion on a side of the other side are displaced from each other.

13. The illumination device of claim 9,
wherein an area of engagement of a predetermined diffusion plate fixing portion among the plurality of the diffusion plate fixing portions with the fixing member is greater than an area of engagement of the other diffusion plate fixing portions with the fixing member.

14. The illumination device of claim 1,
wherein the fixing member or the diffusion plate fixing portion is movable, and
the fixing member or the diffusion plate fixing portion is moved in a direction in which the diffusion plate is pulled.

15. A display device comprising:
the illumination device of claim 1; and
a display panel illuminated by the illumination device.

* * * * *